(12) United States Patent
Al-Salameh et al.

(10) Patent No.: US 7,768,697 B2
(45) Date of Patent: *Aug. 3, 2010

(54) SPECTRALLY RESOLVED FAST MONITOR

(75) Inventors: Daniel Al-Salameh, Marlboro, NJ (US); David J. Dougherty, Mountain View, CA (US)

(73) Assignee: JDS Uniphase Corporation, Milpitas, CA (US)

( * ) Notice: Subject to any disclaimer, the term of this patent is extended or adjusted under 35 U.S.C. 154(b) by 28 days.

This patent is subject to a terminal disclaimer.

(21) Appl. No.: 12/185,893

(22) Filed: Aug. 5, 2008

(65) Prior Publication Data

US 2009/0003767 A1 Jan. 1, 2009

Related U.S. Application Data

(62) Division of application No. 11/243,021, filed on Oct. 4, 2005, now Pat. No. 7,423,804.

(60) Provisional application No. 60/616,353, filed on Oct. 6, 2004.

(51) Int. Cl.
*H01S 3/00* (2006.01)
(52) U.S. Cl. .................. 359/333; 385/37; 385/48
(58) Field of Classification Search ........... 385/37, 385/48; 359/333
See application file for complete search history.

(56) References Cited

U.S. PATENT DOCUMENTS

| | | | |
|---|---|---|---|
| 5,412,744 A | 5/1995 | Dragone | 385/24 |
| 5,541,766 A | 7/1996 | Mizrahi et al. | 359/337 |
| 5,579,143 A | 11/1996 | Huber | 398/72 |
| 6,069,990 A * | 5/2000 | Okawa et al. | 385/43 |
| 6,151,157 A | 11/2000 | Ball et al. | 359/337.12 |
| 6,188,818 B1 | 2/2001 | Han et al. | 385/24 |
| 6,344,915 B1 | 2/2002 | Alexander et al. | 398/115 |
| 6,526,203 B1 | 2/2003 | Gonzalez et al. | 385/37 |
| 6,563,614 B1 | 5/2003 | Stephens et al. | 398/5 |
| 6,608,948 B2 | 8/2003 | Delisle et al. | 385/24 |
| 6,728,435 B2 | 4/2004 | Kashihara et al. | 385/24 |
| 6,937,795 B2 * | 8/2005 | Squires et al. | 385/37 |
| 6,937,821 B1 | 8/2005 | Heath et al. | 398/38 |
| 6,941,079 B1 | 9/2005 | Barozzi et al. | 398/157 |
| 7,019,893 B2 | 3/2006 | Koteles et al. | 359/337.1 |
| 7,031,568 B2 * | 4/2006 | Laming et al. | 385/37 |
| 7,423,804 B2 * | 9/2008 | Al-Salameh et al. | 359/337 |
| 2002/0044317 A1 | 4/2002 | Gentner et al. | 359/337.13 |
| 2002/0191887 A1 * | 12/2002 | Bidnyk | 385/15 |
| 2003/0151799 A1 | 8/2003 | Wight et al. | 359/334 |
| 2003/0185563 A1 | 10/2003 | Stephens et al. | 398/33 |
| 2003/0190166 A1 | 10/2003 | Sekine | 359/337.13 |
| 2004/0001710 A1 | 1/2004 | Peeters et al. | 398/25 |
| 2005/0047722 A1 | 3/2005 | Bhowmik et al. | 385/42 |
| 2005/0052731 A1 | 3/2005 | Corr et al. | 359/341.41 |

* cited by examiner

*Primary Examiner*—Mark Hellner
(74) *Attorney, Agent, or Firm*—Matthew A. Pequiognot; Pequignot + Myers LLC

(57) ABSTRACT

A method and apparatus for monitoring spectral tilt uses an arrayed waveguide grating (AWG) to separate a multiplexed optical signal having a plurality of wavelength channels into a plurality of sub-bands, where each sub-band spans a different wavelength range and includes more than one wavelength channel. A photodetector array is provided to measure the optical power in each of the sub-bands, while control electronics calculate spectral tilt of the multiplexed optical signal using the measured optical power in each of the sub-bands. The spectral tilt monitor in accordance with the instant invention provides spectral resolution, increased monitoring speeds, and decreased manufacturing costs.

11 Claims, 17 Drawing Sheets

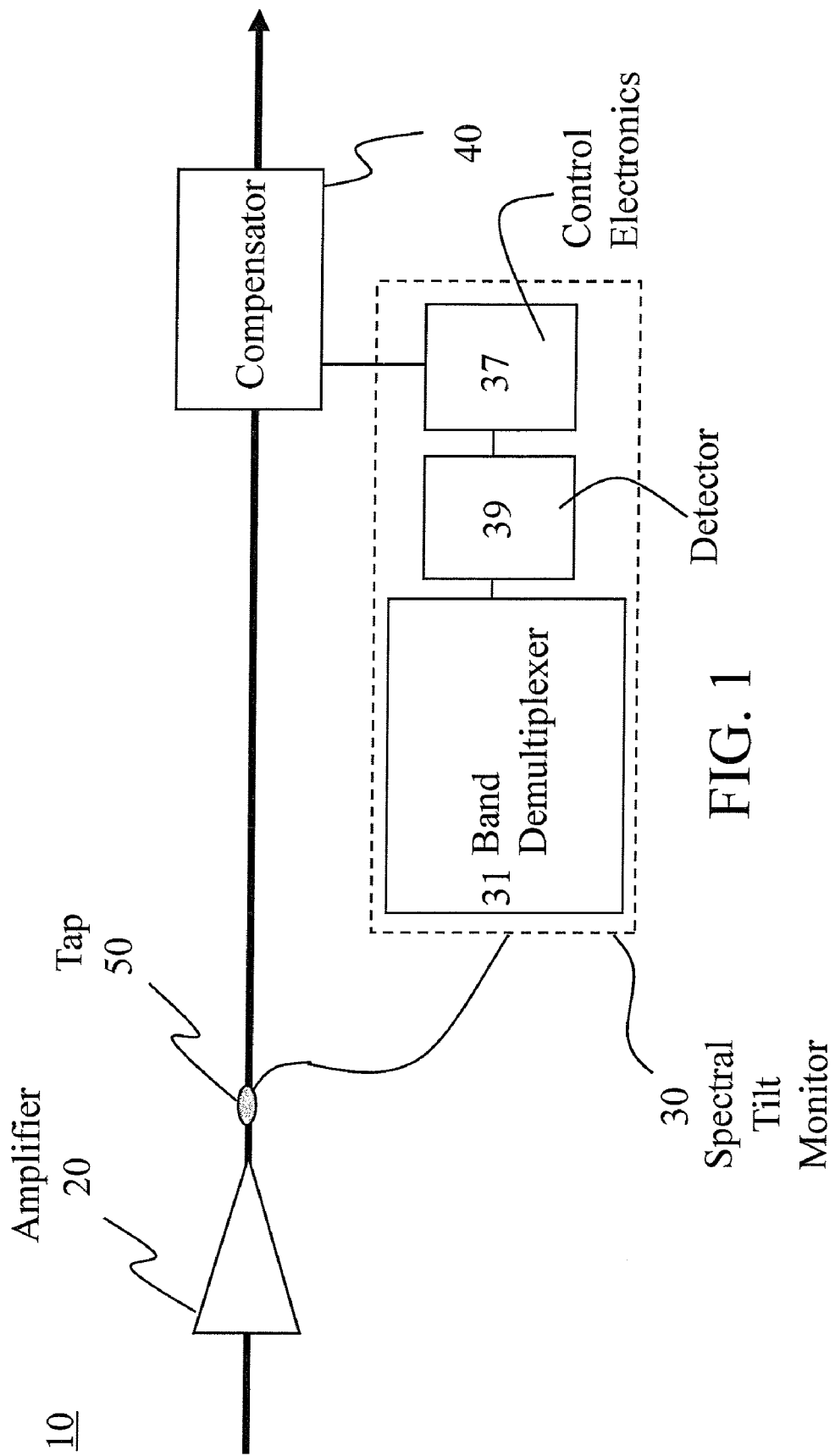

SPECTRALLY RESOLVED FAST MONITOR

CROSS-REFERENCE TO RELATED APPLICATIONS

The present application is a divisional of U.S. patent application Ser. No. 11/243,021, entitled "Spectrally Resolved Fast Monitor", filed on Oct. 4, 2005 now U.S. Pat. No. 7,423,804, which claims the benefit of U.S. Provisional Application No. 60/616,353 filed Oct. 6, 2004, the contents of which are incorporated by reference herein.

MICROFICHE APPENDIX

Not Applicable.

TECHNICAL FIELD

The present application relates generally to monitoring WDM optical signals, and in particular, to a method and apparatus for monitoring tilt in a WDM system having an optical amplifier.

BACKGROUND OF THE INVENTION

In wavelength division multiplexed (WDM) systems, multiple optical channels, each at a different wavelength, are multiplexed and simultaneously transmitted through a single optical fiber. These optical signals need to be amplified (e.g., every 80 to 120 km) to compensate for optical power loss in the optical fiber.

Optical amplifiers utilizing rare earth-doped fiber amplifiers (e.g., EDFAs) in conjunction with optical pump provide optical power gain required to amplify all wavelengths simultaneously, thus lowering the cost of per channel amplification. Problems arise, however, when optical amplifiers do not provide uniform optical power gain to all of the transmitted wavelength channels.

Optical power variations between wavelengths, or spectral distortion, arises directly from optical amplifier gain (e.g., a non-uniform gain profile), and is further distorted by accumulated distortion. Furthermore, shorter wavelengths act as additional power pumps causing longer wavelength to experience additional gain known as Stimulated Raman Scattering (SRS). As a result, spectral tilt occurs with positive slope that continues to increase along the amplifiers chain.

In order to accurately correct and/or control spectral tilt in timely fashion, the tilt needs to be monitored and its slope accurately measured in real time. Conventional monitoring approaches use spectrum analyzers, wherein the spectrum is scanned or demultiplexed into individual wavelength channels where the optical power of each of the demultiplexed wavelength channels is measured separately. While spectrum analyzers are precise, they are also expensive and relatively large devices. Furthermore, while these monitors are accurate for measuring tilt caused by steady-state signal power variations, they are generally too slow for monitoring tilt caused by fast provision, optical channel restoration and optical power transients caused by fiber cut or equipment failures. All these events can cause significant spectral distortions and positive or negative tilt in a time scale of less than microsecond, rendering prior monitoring techniques ineffective in mitigating the negative impact of services.

Monitors for measuring spectral tilt caused by these fast transients are typically single-point monitors that only measure the total power of the optical signal. More specifically, these monitors estimate the spectral tilt using the linear relationship between SRS-induced spectral tilt and total power of the optical signal. These fast monitors, however, lack the spectral resolution and the determination whether the tilt has a positive or negative slope, information necessary to take corrective active.

It is an object of this invention to provide a spectrally resolved fast monitor for measuring spectral tilt.

It is a further object of the instant invention to provide a spectrally resolved fast monitor for measuring spectral tilt that is relatively compact and low cost.

It is a further object of the instant invention to provide fast feedback with accurate data to drive a tilt correcting device and/or drive the optical pump to adjust its optical pump power to a higher or lower magnitude as required.

SUMMARY OF THE INVENTION

The instant invention relates to a method and apparatus for monitoring spectral tilt wherein the optical signal is separated into a plurality of sub-bands, each sub-band spanning a different wavelength range, the number of sub-bands being less than the number of wavelength channels. Spectral tilt is calculated using the optical power measured in each of the sub-bands.

According to one embodiment, the optical signal is separated into the plurality of sub-bands using a plurality of thin-film-filters (TFFs). According to another embodiment, the optical signal is separated into the plurality of sub-bands using an arrayed waveguide grating (AWG).

Advantageously, the spectral tilt monitor is designed to provide spectral resolution, to increase monitoring speeds, and to decrease manufacturing costs. Moreover, it can be designed to provide a flat transmission over an arbitrarily wide and sub-band passband with no inherent design loss, while still being able to separate bands of channels at the resolution of the channel spacing with very high isolation and no requirement for dead or skipped channels.

In accordance with one aspect of the instant invention there is provided a method of monitoring spectral tilt comprising: passing a multiplexed optical signal having a plurality of wavelength channels through a spectral tilt monitor such that an arrayed waveguide grating in the spectral tilt monitor separates the multiplexed optical signal into a plurality of sub-bands, each sub-band including more than one wavelength channel from the plurality of wavelength channels; measuring the optical power in each of the sub-bands; and, calculating spectral tilt of the multiplexed optical signal using the measured optical power in each of the sub-bands.

In accordance with one aspect of the instant invention there is further provided a spectral tilt monitor comprising: an arrayed waveguide grating for separating a multiplexed optical signal having a plurality of wavelength channels into a plurality of sub-bands, each sub-band including more than one wavelength channel from the plurality of wavelength channels.

According to one embodiment the number of wavelength channels in the plurality of wavelength channels is n, and the arrayed waveguide grating includes: an optical waveguide for transmitting the multiplexed optical signal; a waveguide array having a first end optically coupled to a first slab waveguide and a second end optically coupled to a second slab waveguide, the first slab waveguide for receiving the multiplexed optical signal from the optical waveguide, the second slab waveguide for focussing n demultiplexed sub-signals of the multiplexed optical signal to n separate locations; and a plurality of multi-mode output waveguides optically coupled to the second slab waveguide, each multi-mode output waveguide having a width selected to collect a plurality of the demultiplexed sub-signals and provide one of the sub-bands.

In accordance with one aspect of the instant invention there is further provided an arrayed waveguide grating comprising: an optical waveguide for transmitting a multiplexed optical signal having n wavelength channels; a waveguide array having a first end optically coupled to a first slab waveguide and a second end optically coupled to a second slab waveguide, the first slab waveguide for receiving the multiplexed optical signal from the optical waveguide, the second slab waveguide for focussing n demultiplexed sub-signals of the multiplexed optical signal to n separate locations; and, a plurality of multi-mode output waveguides optically coupled to the second slab waveguide, each multi-mode output waveguide having a width selected to collect a plurality of the demultiplexed sub-signals.

In accordance with another aspect of the instant invention there is provided a spectral tilt monitor comprising: an input for providing a multiplexed optical signal having a plurality of wavelength channels; a plurality of thin-film-filters optically coupled to the input for separating the multiplexed optical signal into a plurality of sub-bands, each sub-band including more than one wavelength channel from the plurality of wavelength channels; a photodetector for measuring the optical power in each of the sub-bands; and control electronics for calculating spectral tilt of the multiplexed optical signal using the measured optical power in each of the sub-bands.

BRIEF DESCRIPTION OF THE DRAWINGS

Further features and advantages of the present invention will become apparent from the following detailed description, taken in combination with the appended drawings, in which:

FIG. 1 is a schematic diagram of a node in a WDM system having a spectral tilt monitor in accordance with one embodiment of the instant invention;

It will be noted that throughout the appended drawings, like features are identified by like reference numerals.

DETAILED DESCRIPTION OF THE PREFERRED EMBODIMENTS

Figure 2A:
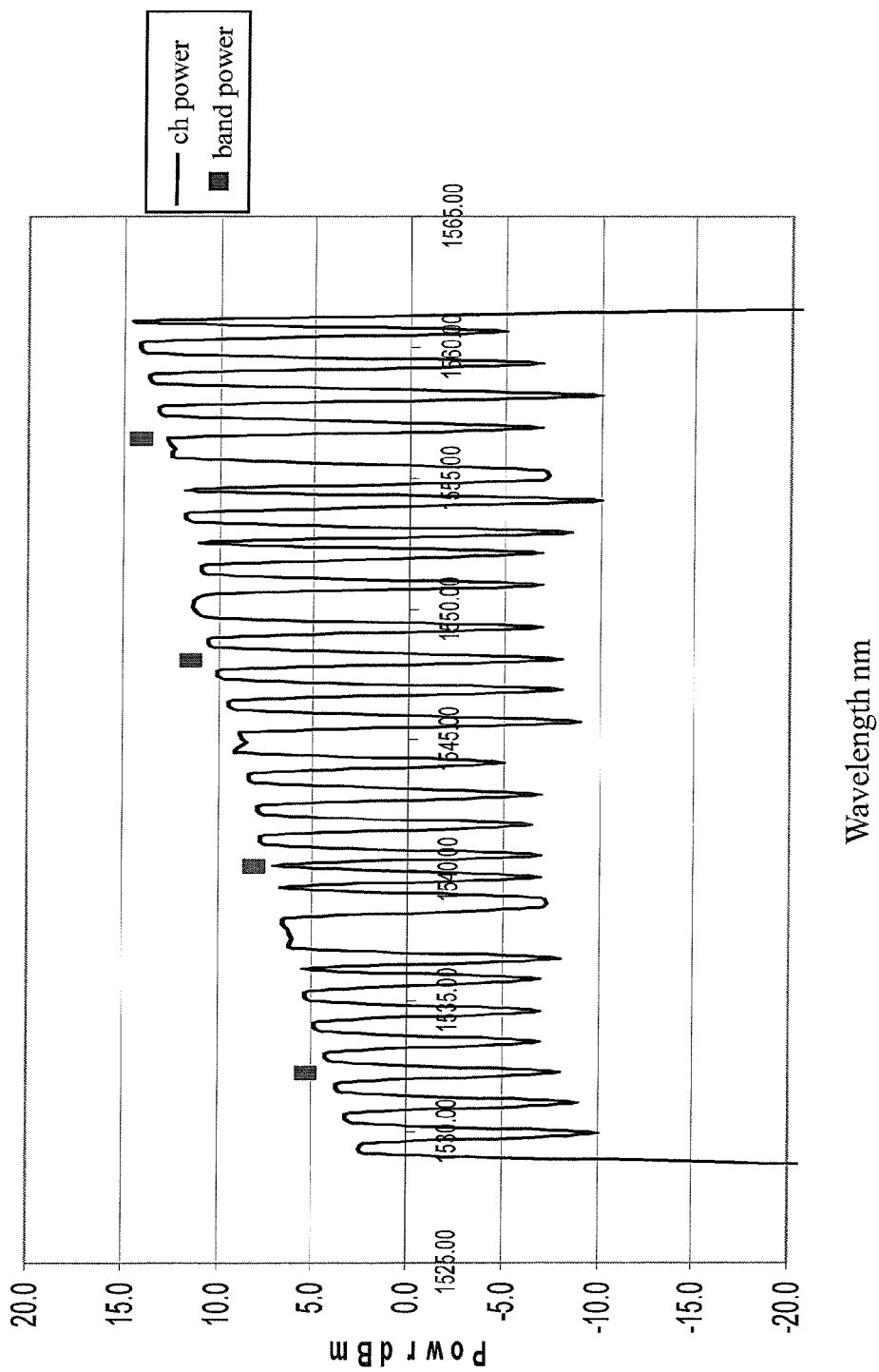
FIG. 2A shows the spectral tilt calculated with a high channel count and an even channel distribution.

Referring to FIG. 1 there is shown a schematic diagram of a node 10 in a WDM system. The node 10 includes an optical amplifier 20, a spectral tilt monitor 30, a spectral tilt compensator 40, and a tap 50. Other elements, for example dispersion compensating modules (DCMs) (not shown), are optionally included.

The optical amplifier 20 amplifies WDM optical signals transmitted into the node 10. One example of a suitable optical amplifier is a rare-earth doped fiber amplifier, such as an erbium-doped fiber amplifier (EDFA). Of course, other optical amplifiers, such as a Raman amplifier or EDFA Raman hybrid, are also possible. The optical amplifier 20 boosts the power level of all of the optical signals carried in the wavelength channels at the same time, while simultaneously introducing spectral tilt and/or intensifying spectral tilt introduced upstream from the amplifier 20.

The spectral tilt monitor 30 monitors and/or measures the spectral tilt in the amplified light. In accordance with the instant invention, the spectral tilt monitor 30 includes a band demultiplexer 31 for separating the WDM optical signal into a plurality of sub-bands (i.e., wavelength bands). Each sub-band spans a different wavelength range and has a known maximum number of wavelength channels. The bandwidth of each sub-band is the same or different from adjacent sub-band (s), but does not over-lap other sub-bands. Each sub-band is either fully loaded, not loaded, or partially loaded. The spectral tilt-monitor 30 also includes a detector 39 for measuring the total optical power of each sub-band and control electronics 37 for calculating the spectral tilt based on the total optical power measured in each sub-band.

The spectral tilt compensator 40 receives a control signal from the control electronics 37 and compensates for the spectral tilt. Some examples of suitable spectral tilt compensators include gain flattening filters (GFFs), variable optical attenuators (VOAs), and/or dynamic gain equalizers (DGEs). Alternatively, the spectral tilt compensator is provided as part of the optical amplifier (i.e. spectral tilt may be compensated by adjusting the operating conditions of the optical amplifier) and/or as part of a 2-stage optical amplifier.

The tap 50, taps a relatively small portion (e.g., 5%) of the amplified optical signal and redirects it to the spectral tilt monitor 30, while the remaining part of the amplified optical signal is transmitted to the spectral tilt compensator 40. One example of a suitable tap is a 5/95 coupler tap.

Advantageously, the spectral tilt monitor in accordance with the instant invention provides increased monitoring speed and decreased manufacturing costs relative to a spectrum analyzer (e.g., there are few photodetectors required). Furthermore, the spectral tilt monitor in accordance with the instant invention provides increased spectral resolution relative to a single power measurement.

Figure 2B:
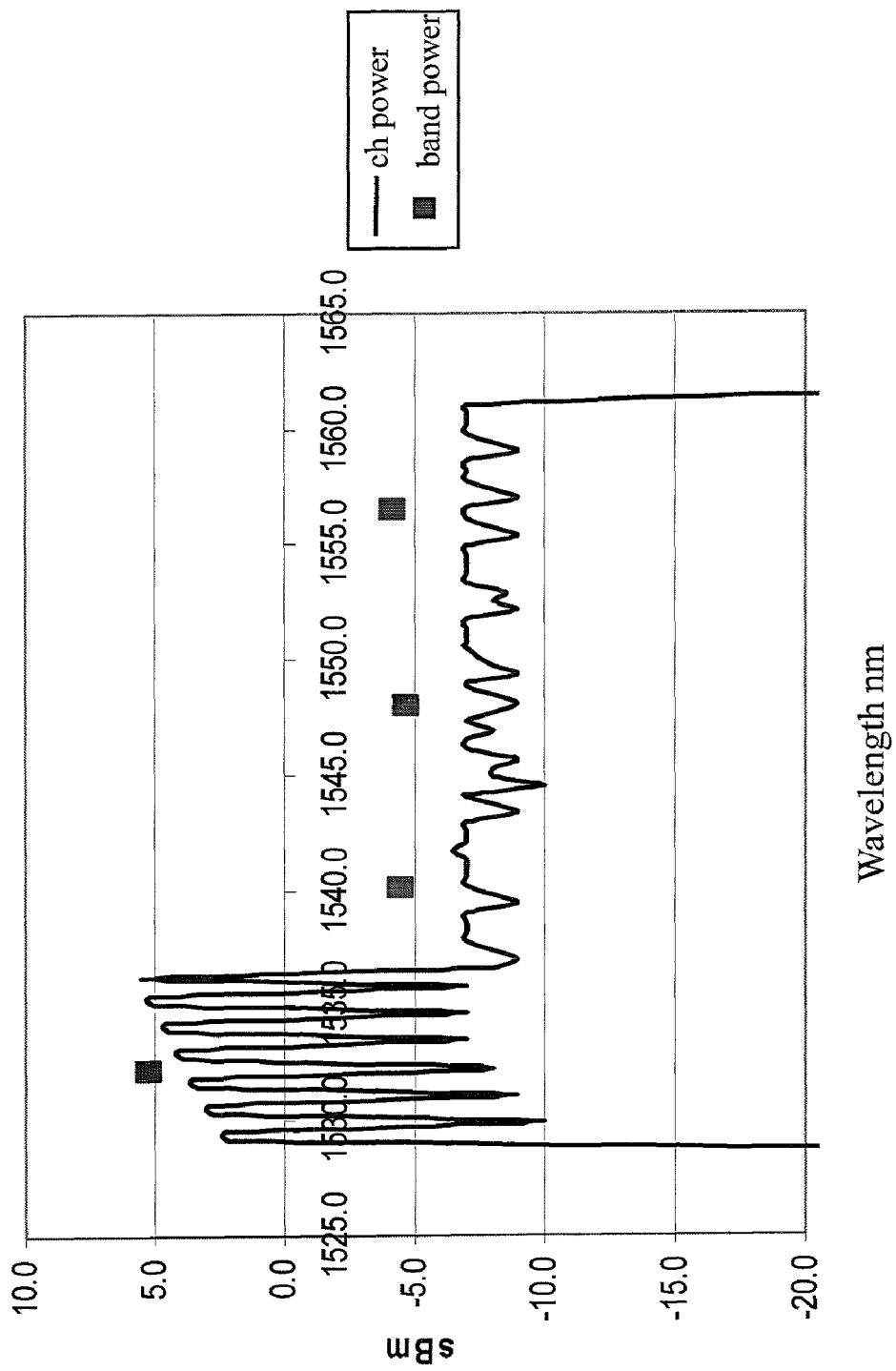
FIG. 2B shows the spectral tilt calculated when one sub-band is fully loaded and the others are not loaded.
Figure 2C:
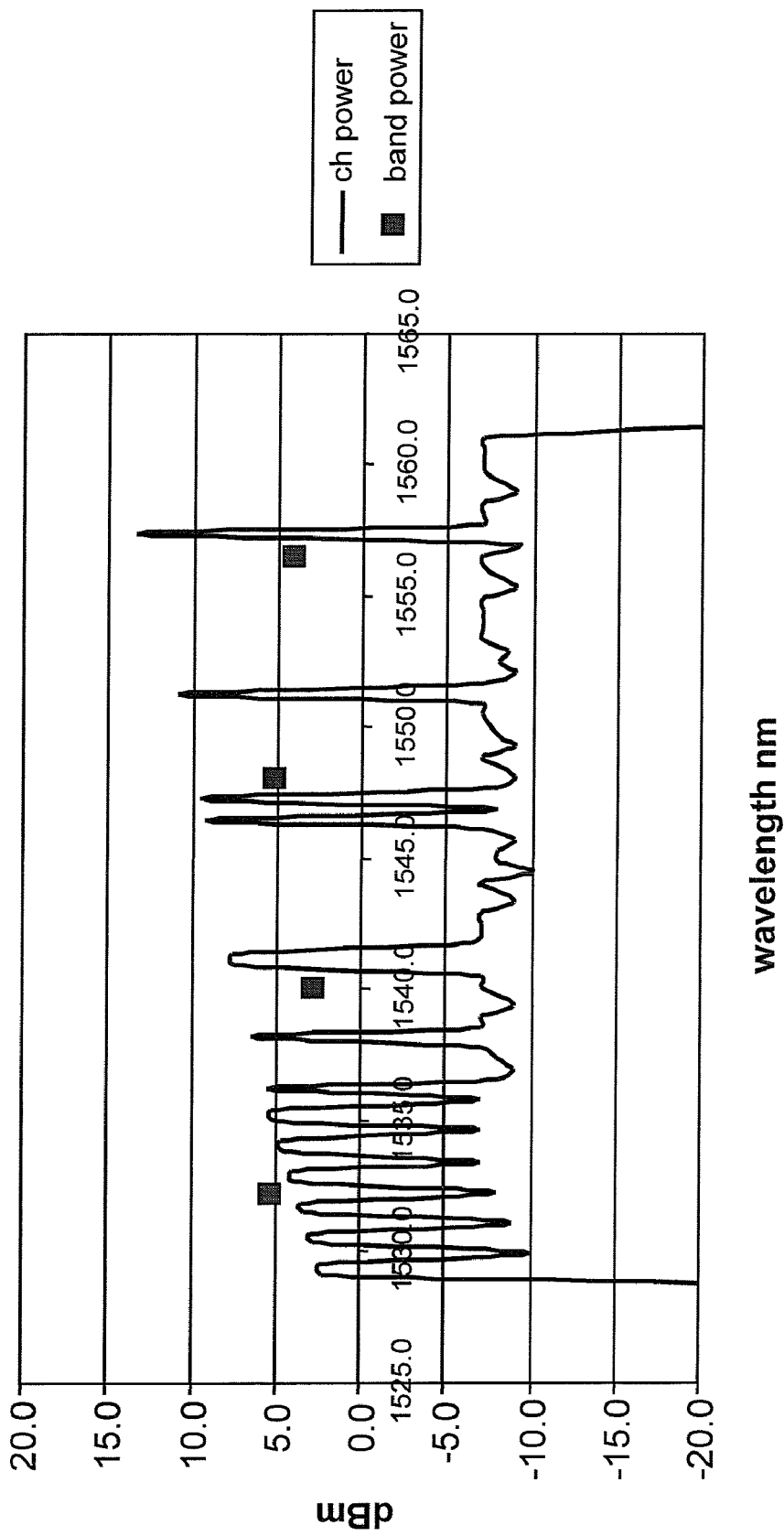
FIG. 2C shows the spectral tilt calculated when one sub-band is fully loaded and the others are partially loaded.
Figure 2D:
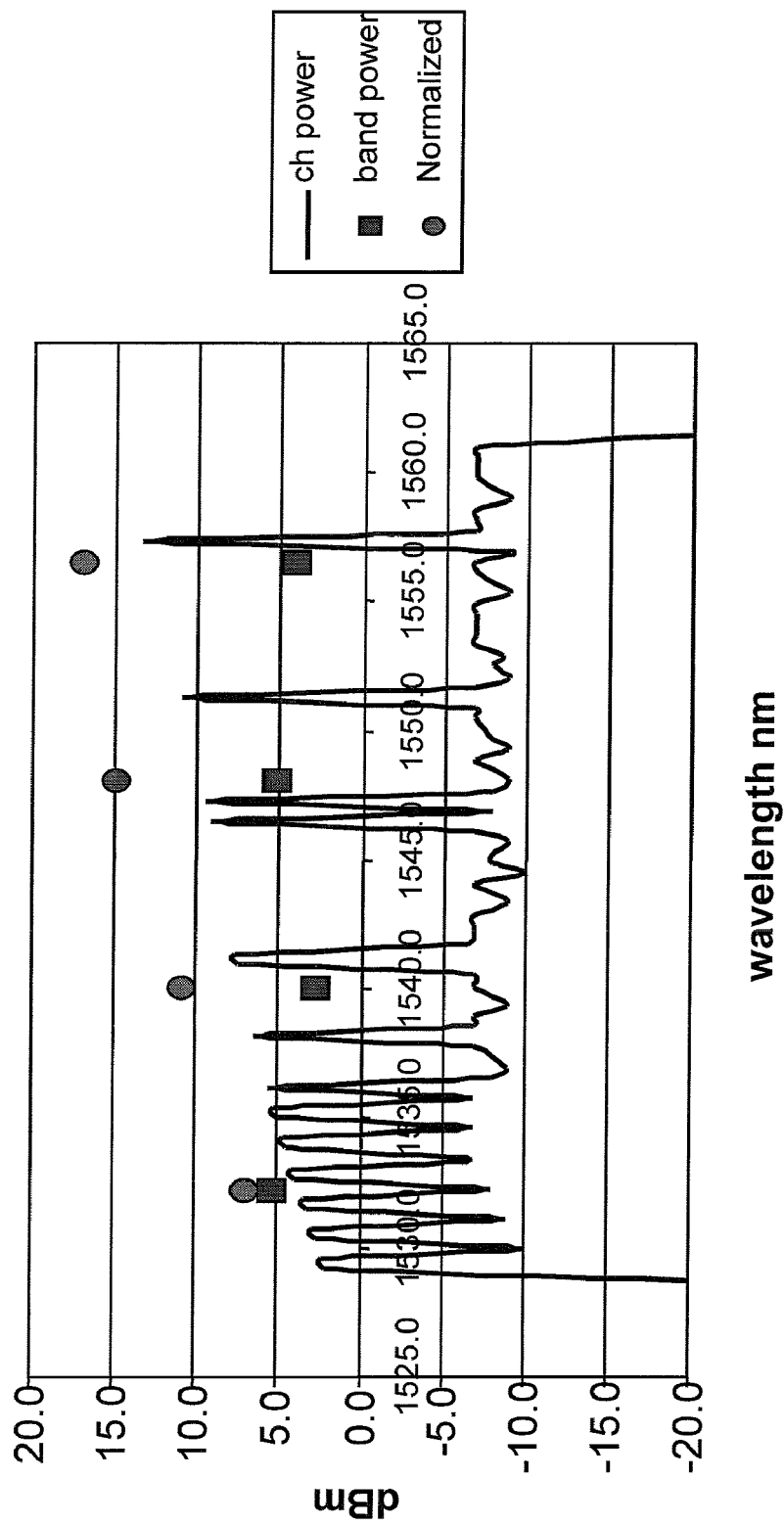
FIG. 2D compares the spectral tilt calculated in FIG. 2C with that calculated with a normalized band power.

Notably, this increased spectral resolution provides for a more accurate calculated spectral tilt, particularly when wavelength channels are added and/or dropped from the WDM system. For example, consider the experimental and simulation results illustrated in FIGS. 2A, 2B, and 2C. For exemplary purposes, the spectral tilt is calculated through a linear fitting of four data points, each data point corresponding to the total optical power in one of four sub-bands. In FIG. 2A, wherein the optical signal has a high channel count and an even channel distribution, the plotted spectral tilt is shown to be very accurate. In FIG. 2B, wherein one sub-band is fully loaded and the others are not loaded, the plotted spectral tilt is poor. In FIG. 2C, wherein one sub-band is fully loaded and the others are partially loaded, the plotted spectral tilt is also erroneous. In the latter instances, however, it is possible to use the spectral resolution to normalize the optical power per sub-band and to increase the accuracy of the calculated spectral tilt. For example, consider FIG. 2d, which compares the spectral tilt obtained from the measured band power (band power) and a normalized band power (normalized). The normalized band powers are calculated using a known channel loading and/or an estimated channel loading.

Figure 3:
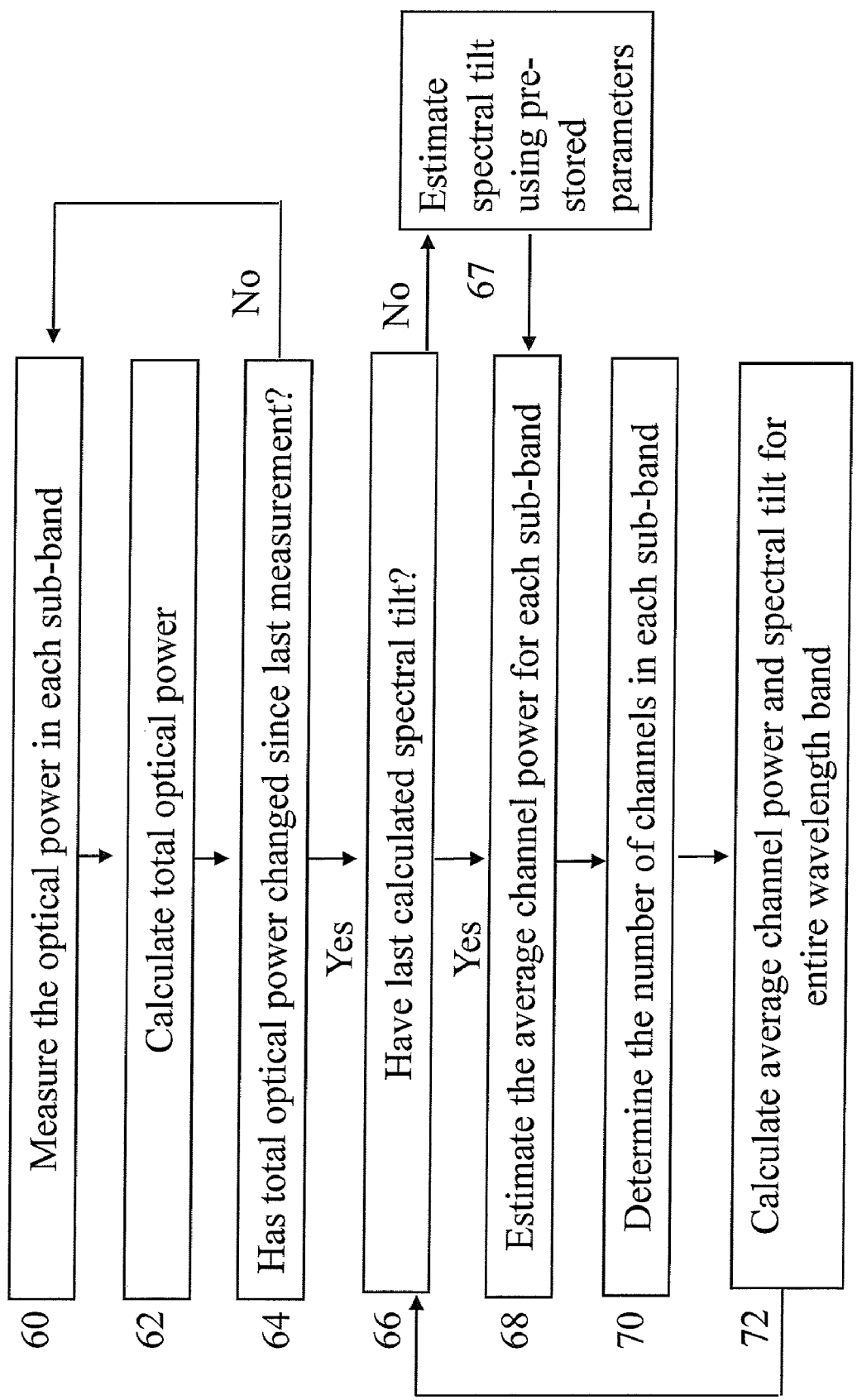
FIG. 3 is a flow chart illustrating one embodiment of an algorithm for calculating spectral tilt.

Referring to FIG. 3, there is shown one example of an algorithm wherein the total power in each band is essentially normalized by converting optical power to units of dB to determine relative power gain or loss according to the channel loading. In the first step 60, the spectral tilt monitor measures the optical power in each of the sub-bands using the plurality of photodetectors. Next, the total optical power from all of the wavelength channels is calculated as the sum of the measured optical powers 62. In step 64, the total optical power is compared to a previously calculated value. If the total optical power is relatively constant, then step 60 is repeated. If the total optical power is significantly different from the previously calculated value, then spectral tilt is calculated according to steps 68-72. More specifically, spectral tilt is calculated as follows: an estimated average power per channel is calculated for each sub-band (68); the number of loaded channels per sub-band is determined by dividing the measured optical power per sub-band by the estimated average power per channel (70), and finally, using the number of loaded channels determined in step 70 and the measured optical powers in step 60, a normalized band power in units of dB is calculated (72). These normalized band powers are plotted to yield the new spectral tilt.

In step 67, the spectral tilt is estimated using the total signal power in the fiber, attenuation of the fiber, dispersion, the fiber type, and the fact that SRS induced slope depends on shorter wavelength loading. Accordingly, the pre-stored parameters include: total power and number of channels in a fully loaded system, fiber span length, input power, fiber type, and a plot of SRS induced tilt vs. fiber length.

In step 68, the average power per channel is calculated using the following equation:

$$P(j) = P_{Ave} + \frac{dP}{df}(f_j - \langle f \rangle)$$

where P(j) is equal to the average power per channel in band number j, $P_{Avg}$ is equal to the average power per channel obtained from sum of the normalized powers from the photodetectors divided by the total number of channels in the fully loaded system, $f_j$ is the center frequency of the $j^{th}$ band, and $\langle f \rangle$ is the average center frequency over all the bands. Notably, this equation assumes that the channel distribution is linear.

Figure 4A:
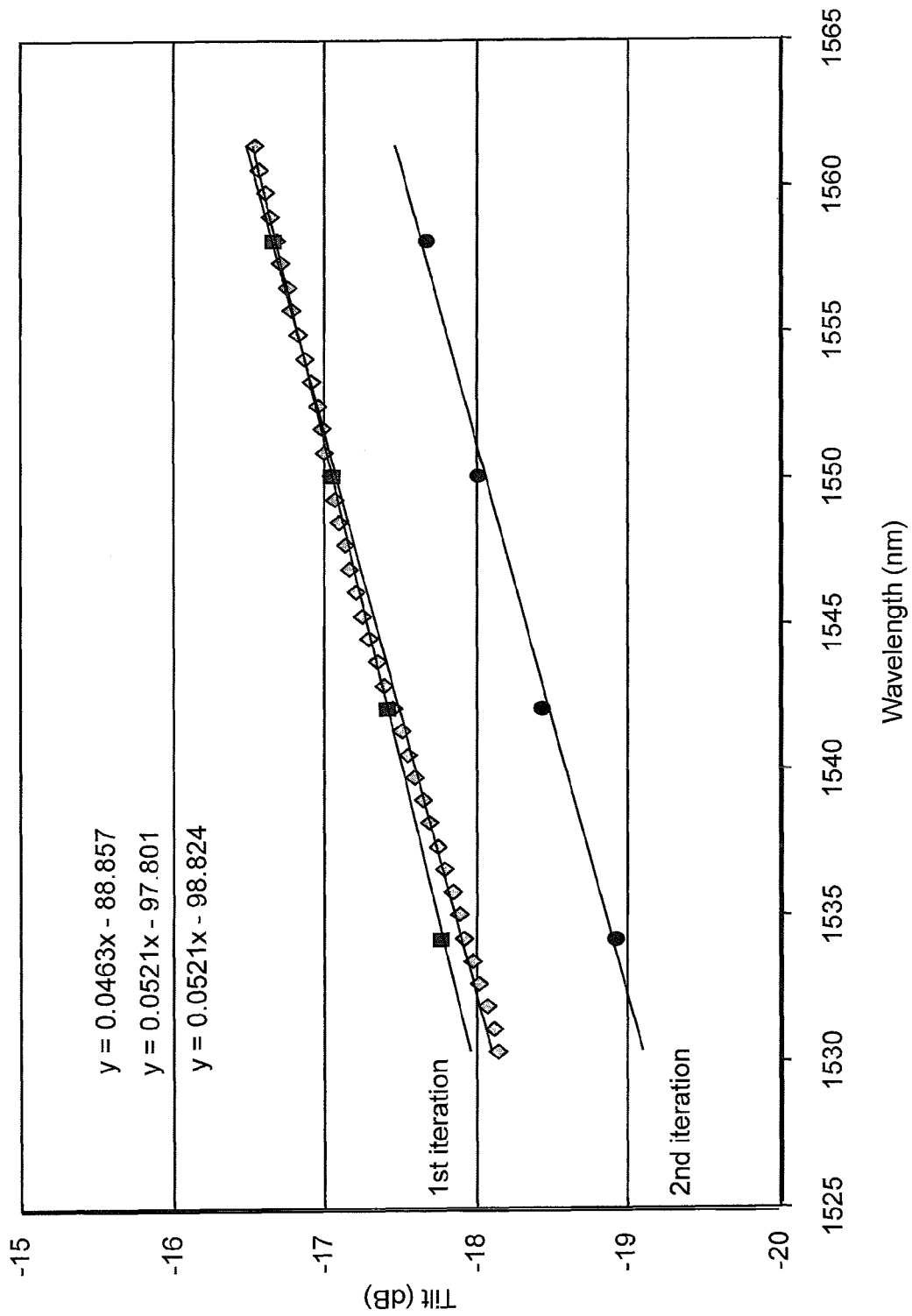
FIG. 4A illustrates the spectral tilt calculated with the algorithm discussed in FIG. 3 when the 40 channel wavelength band is fully loaded.
Figure 4B:
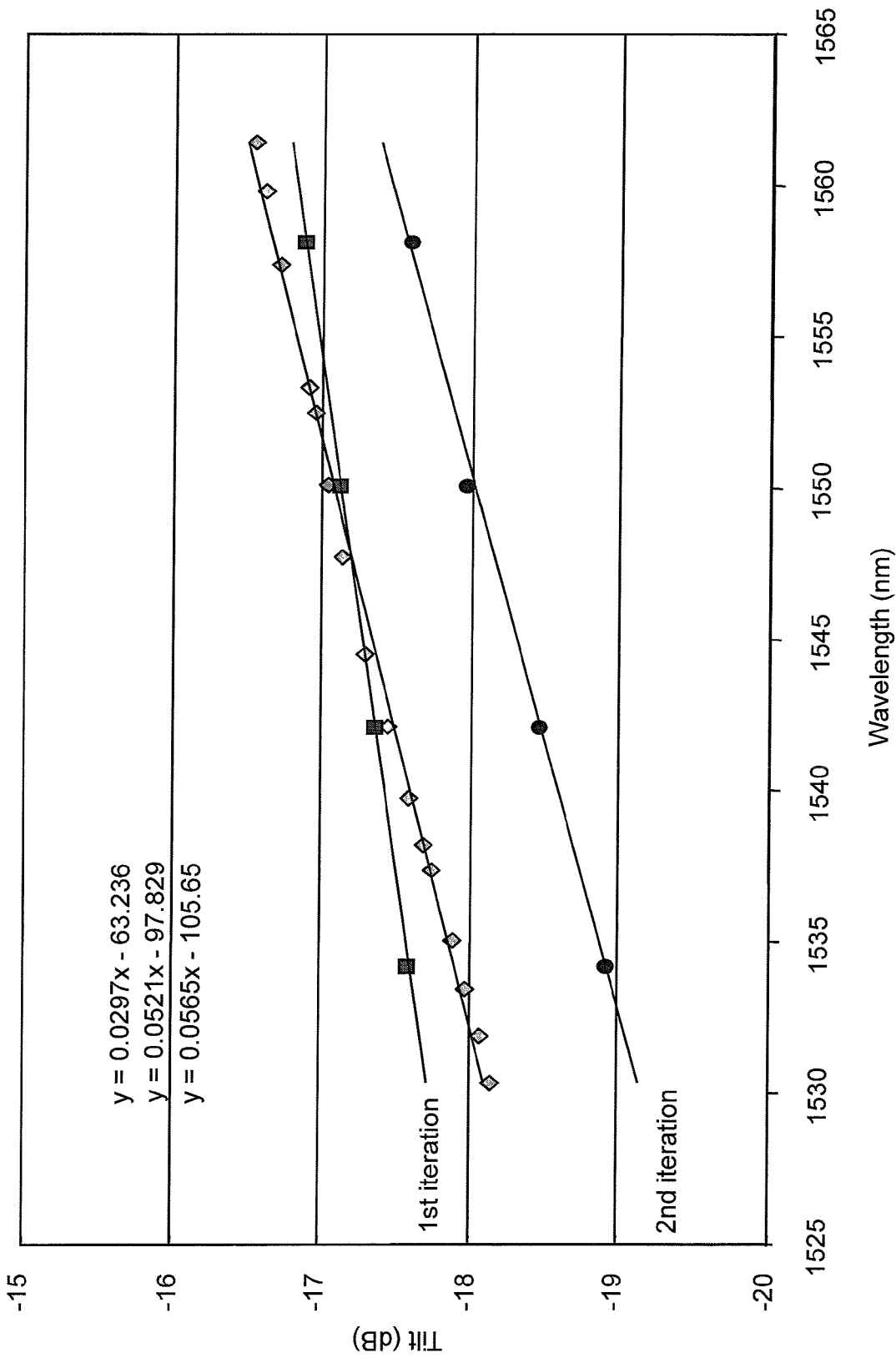
FIG. 4B illustrates the spectral tilt calculated with the algorithm discussed in FIG. 3 when 16 of the 40 channel wavelengths are loaded.
Figure 4C:
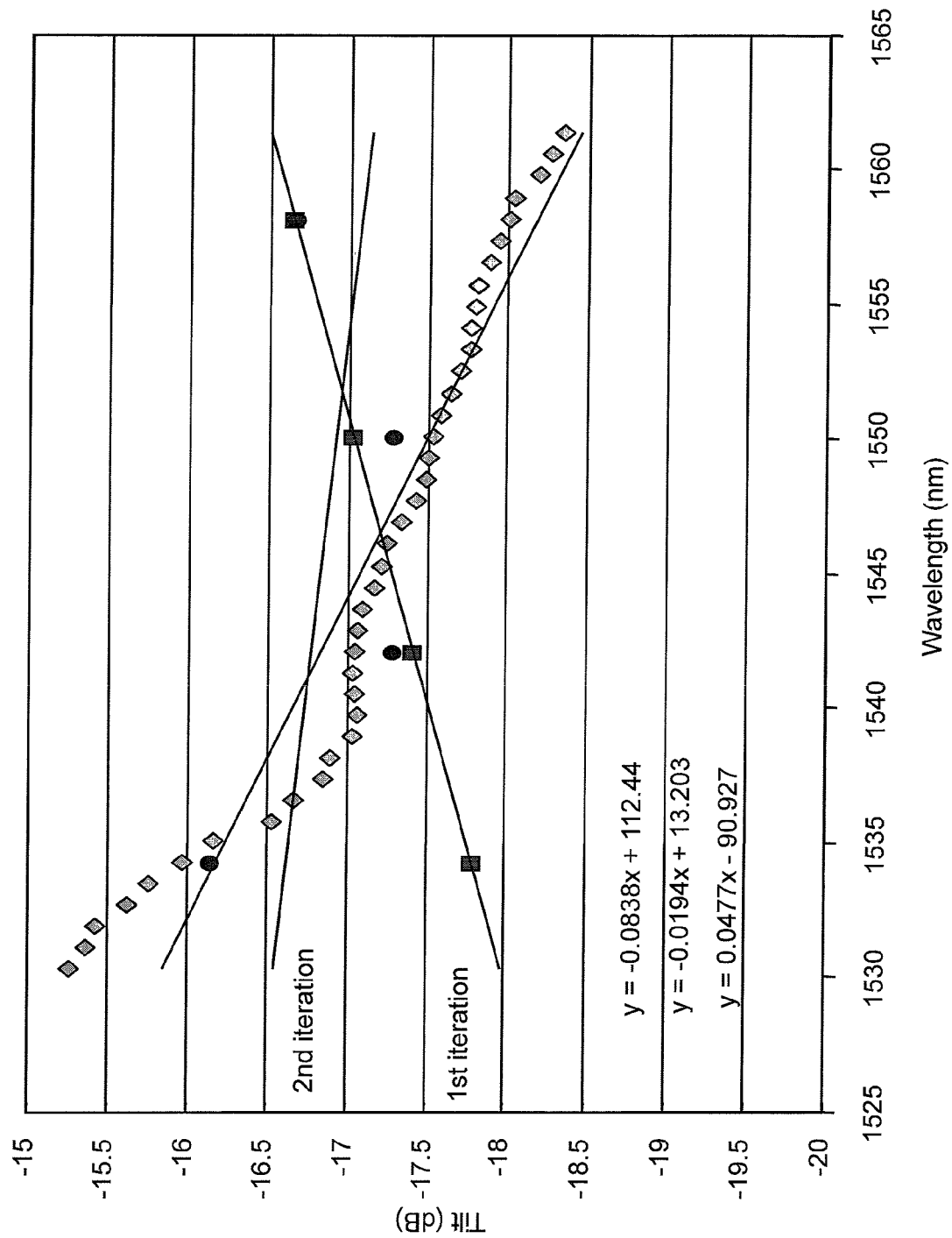
FIG. 4C illustrates the spectral tilt calculated with the algorithm discussed in FIG. 3 in an extreme tilt case.
Figure 4D:
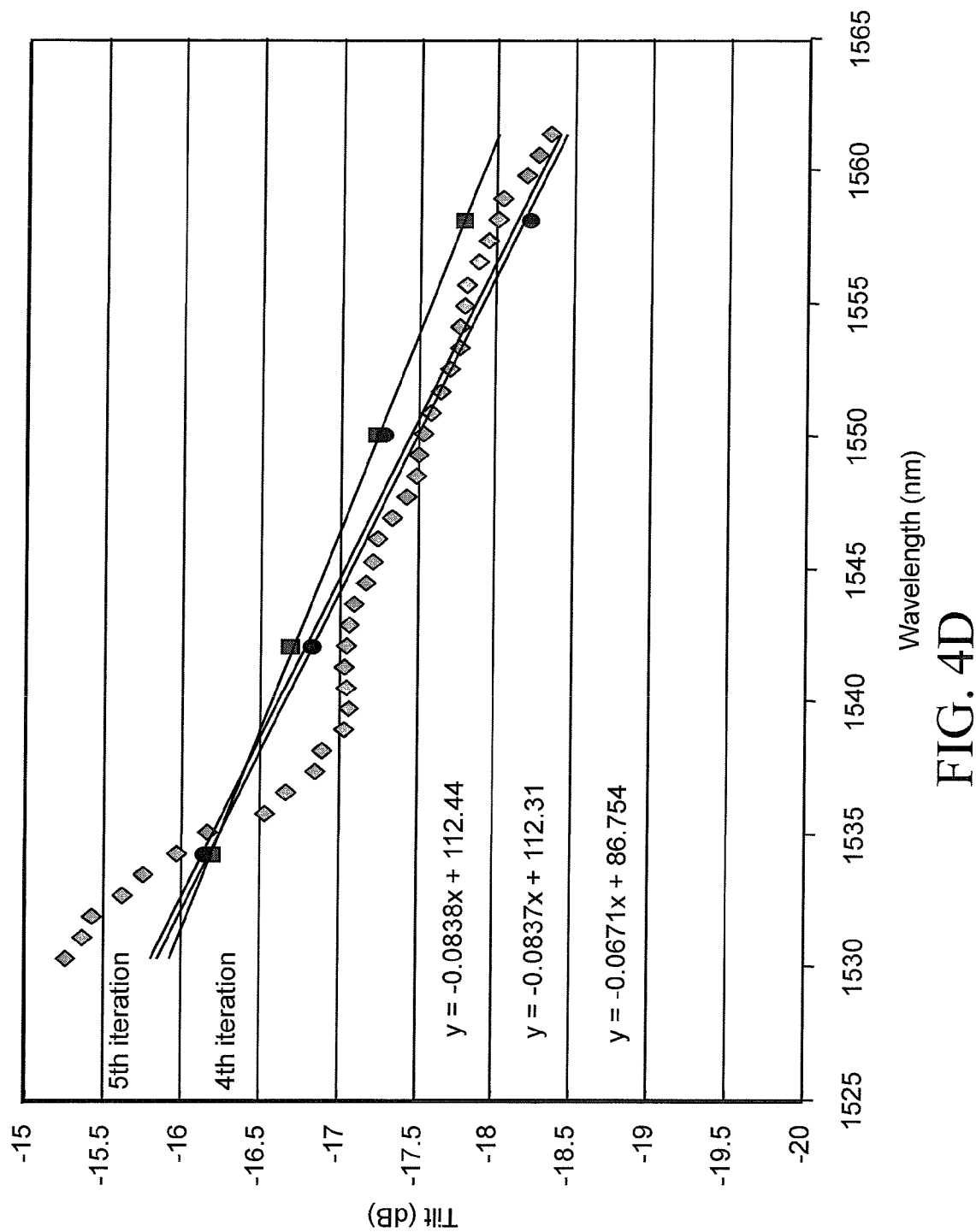
FIG. 4D illustrates the spectral tilt calculated with the algorithm discussed in FIG. 3 in an extreme tilt case.

FIGS. 4a-4d illustrate various spectral tilts simulated using the above algorithm. In these simulations, the optical signal is assumed to be a standard 40 channel WDM with 100 GHz spacing. In FIG. 4A, wherein the 40 channel wavelength band is fully loaded, the 1.67 dB spectral tilt is calculated to be 1.48 dB after the first iteration and 1.67 dB after the second iteration. In FIG. 4B, wherein 16 of the 40 channels are loaded, the 1.67 dB spectral tilt is calculated to be 0.95 dB after the first iteration and 1.80 after the second iteration. In FIGS. 4C and 4D, wherein the spectral tilt of the fully loaded 40 channel wavelength band is non-linear, the −2.68 dB spectral tilt is impressively estimated to be −2.15 dB after the fourth iteration and −2.68 after the fifth iteration.

Figure 5:
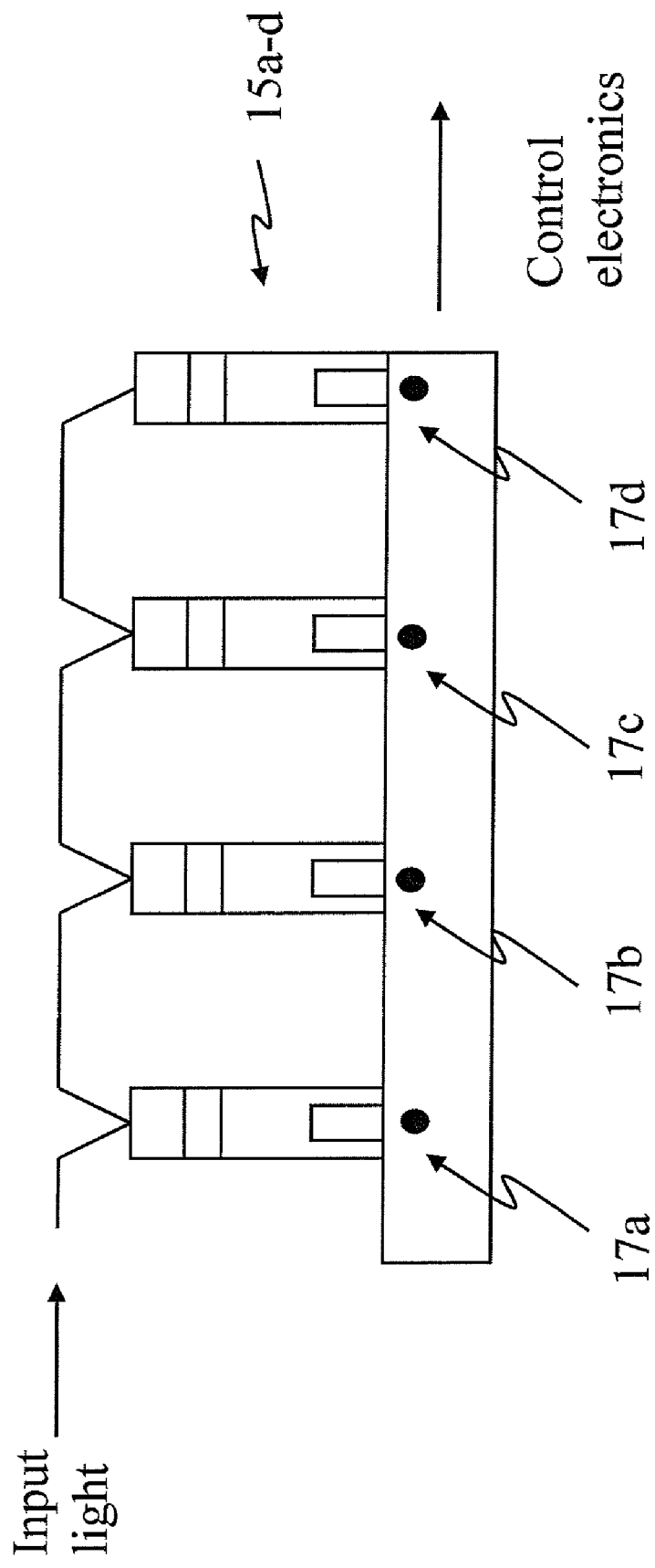
FIG. 5 is a schematic diagram of an demultiplexer suitable for use in the spectral tilt monitor shown in FIG. 1.

Referring to FIG. 5, there is shown one embodiment of the band demultiplexer 31 described in FIG. 1. The demultiplexer includes four thin-film-filters (TFFs) 15a-d, each of which is shown coupled to a different photodetector 17a-d. One example of a suitable photodetector is an edge mounted photodiode. Optionally, the four photodetectors are provided as an array to reduce manufacturing costs.

In operation, a 40 channel WDM optical signal is launched into the demultiplexer where it is directed to a first TFF 15a. The first filter 15a passes a first portion (i.e., a first sub-band) of the optical signal to the first photodetector 17a, where the optical power is measured, and a second portion to the next TFF 15b. The second filter 15b passes a first portion (i.e., a second sub-band) of the filtered optical signal to the photodetector 17b, where the optical power is measured, and a second portion to the next TFF 15c. The third filter 15c passes a first portion (i.e., a third sub-band) of the twice filtered optical signal to the photodetector 17c, where the optical power is measured, and a second portion to the next TFF 15d. The filter 15d passes the remaining optical signal (i.e., the fourth and remaining sub-band) to the fourth photodetector 17d. The spectral tilt is calculated using the optical power measured for each of the sub-bands (e.g., using the algorithm described with respect to FIG. 3). Optionally, the spectral tilt is calculated with an algorithm (not shown) that compensates for channels between sub-bands that are suppressed by the TTFs.

Advantageously, using a spectral tilt monitor based on TFFs provides increased spectral resolution, provides feedback about whether the tilt has a positive or negative slope, is fast, and is reliable. With regard to monitoring speed, the spectral tilt monitor in accordance with the instant invention has been found to correct tilt using a VOA and/or GFF in less than about one microsecond. Although VOAs and GFFs are less accurate than some compensating devices, it has been found that the combination of the TFF based spectral tilt monitor with a fast tilt compensator (using VOAs and GFFs) provides close to optimal end-to-end performance.

Figure 6A:
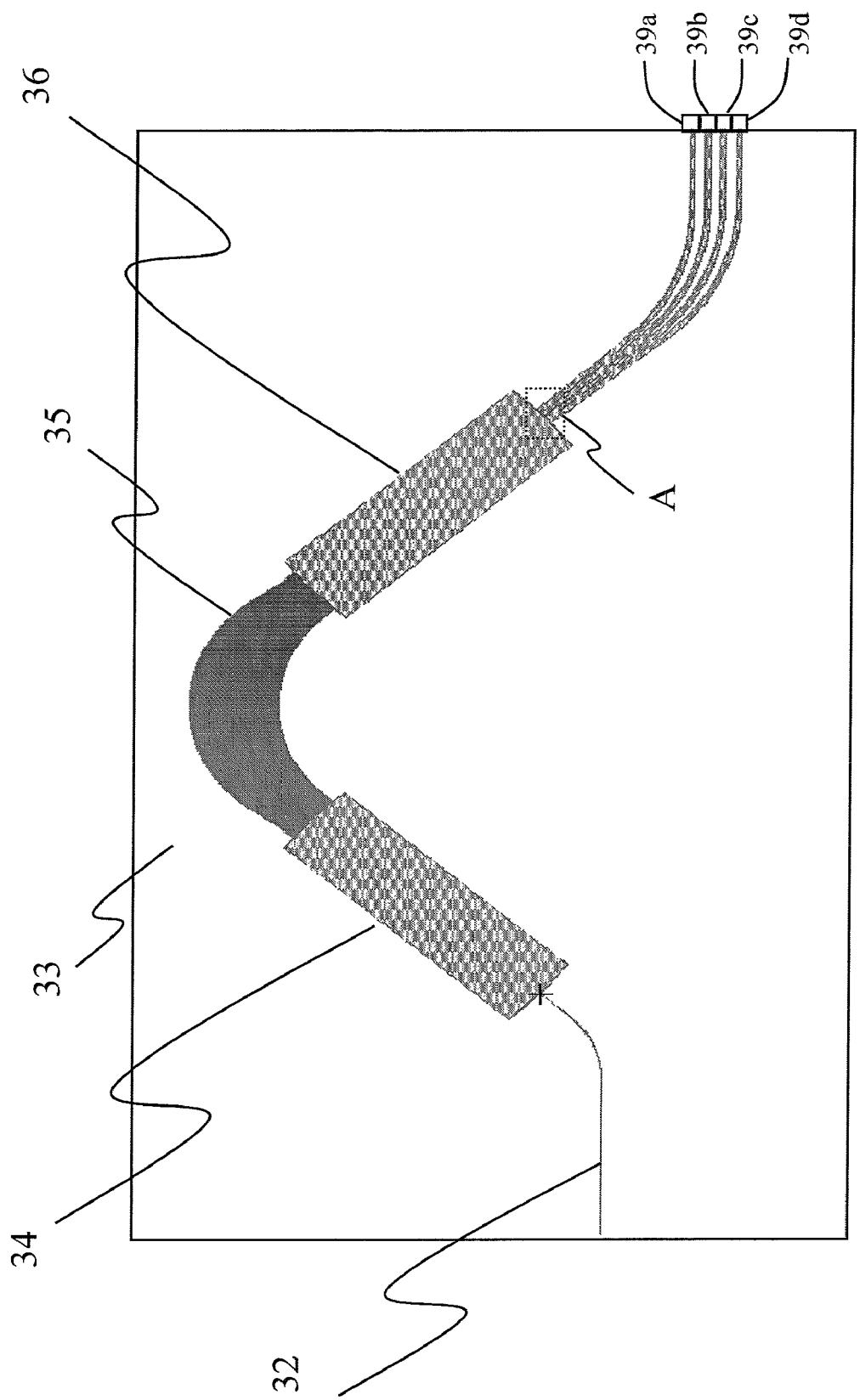
FIG. 6A is a schematic diagram of another demultiplexer based on a AWG that is suitable for use in the spectral tilt monitor shown in FIG. 1.
Figure 6B:
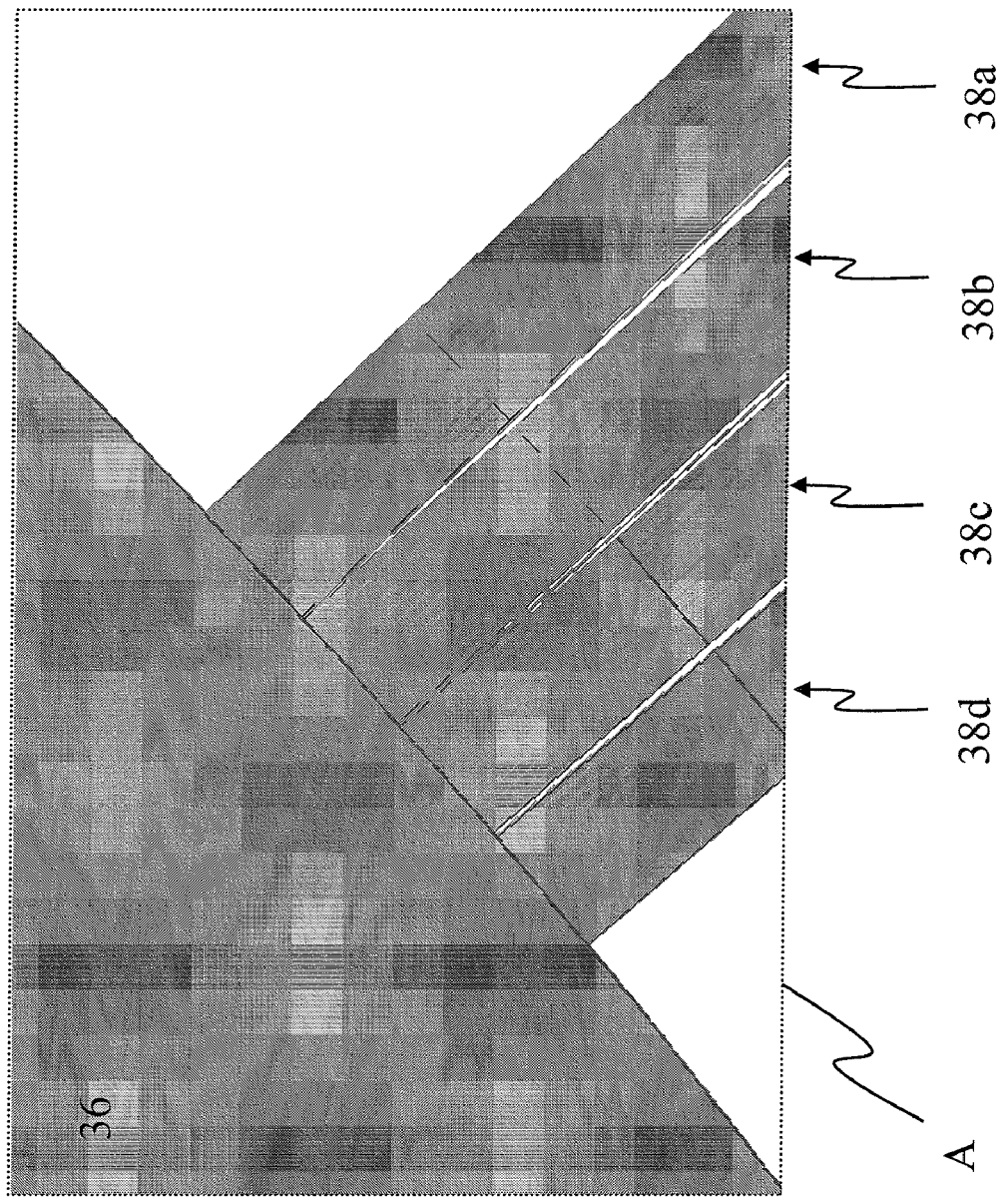
FIG. 6B is a schematic diagram illustrating the position and width of standard 40 channel outputs relative to the multi-mode waveguides.

Referring to FIGS. 6A and 6B, there is shown another embodiment of the band demultiplexer 31 described with respect to FIG. 1. The demultiplexer is based on an AWG that includes a single, single-mode input waveguide 32, a first slab waveguide 34, a waveguide array 35 having a plurality of single-mode waveguides with different lengths, a second slab waveguide 36, and four wide, highly multi-mode output waveguides 38a-d, all of which are disposed on a single substrate 33. For illustrative purposes, the AWG 31 is based on a standard 40 channel 100 GHz AWG. Also shown are four photodetectors 39a-d, which are coupled to the substrate 33 such that each of the photodetectors 39a-d is positioned at the end of a different multi-mode waveguide 38a-d. Preferably, each photodetector 39a-d has a width sufficiently large to collect all the light from the corresponding multi-mode output waveguide 38a-d. This criteria is met, for example, if each photodetector has a width greater than the width of the output of the corresponding multi-mode waveguide. One example of a suitable photodetector is an edge mounted photodetector. Optionally, the four photodetectors are provided as an array to reduce manufacturing costs.

In operation, a 40 channel WDM optical signal is launched into the single-mode input waveguide 32 where it is passed through the first slab waveguide 34 and directed into the waveguide array 35. Since the plurality of waveguides in the array have different lengths, the different portions of optical signal propagating through different waveguides will have different phases and interference will occur. This interference results in the demultiplexing of the optical signal, the demultiplexed components of which are imaged on the outside edge of the second slab waveguide 36. In a conventional AWG, which is well known in the art and not discussed further, each of the imaged demultiplexed components is collected by a different waveguide. In the AWG shown in FIG. 6A, the multi-mode optical waveguides 38a-d collect small groups of the imaged demultiplexed components (i.e., small groups of adjacent wavelength channels). As illustrated in FIG. 6B, each of the four multi-mode output waveguides 38a-d is sufficiently wide to collect 10 adjacent wavelength channels (i.e., 38a collects $\lambda_1$-$\lambda_{10}$, 38b collects $\lambda_{11}$-$\lambda_{20}$, 38c collects $\lambda_{21}$-$\lambda_{30}$, and 38d collects $\lambda_{31}$-$\lambda_{40}$). The optical power of these sub-bands is measured with the photodetectors 39a-d and the spectral tilt is calculated (e.g., using the algorithm described with respect to FIG. 3).

Advantageously, the AWG described above provides increased spectral resolution, provides feedback about whether the tilt has a positive or negative slope, provides a wide flattop line shape for each sub-band with no design loss penalty, achieves no-gap operation, is fast, is accurate, is reliable, and is easily integrated with other components to form a compact device. Several of these advantages are realized because the AWG possesses sufficient resolution to resolve the number of channels in the optical signal (i.e., in this embodiment 40), but then compromises resolution by grouping the channels into sub-bands.

Figure 6C:
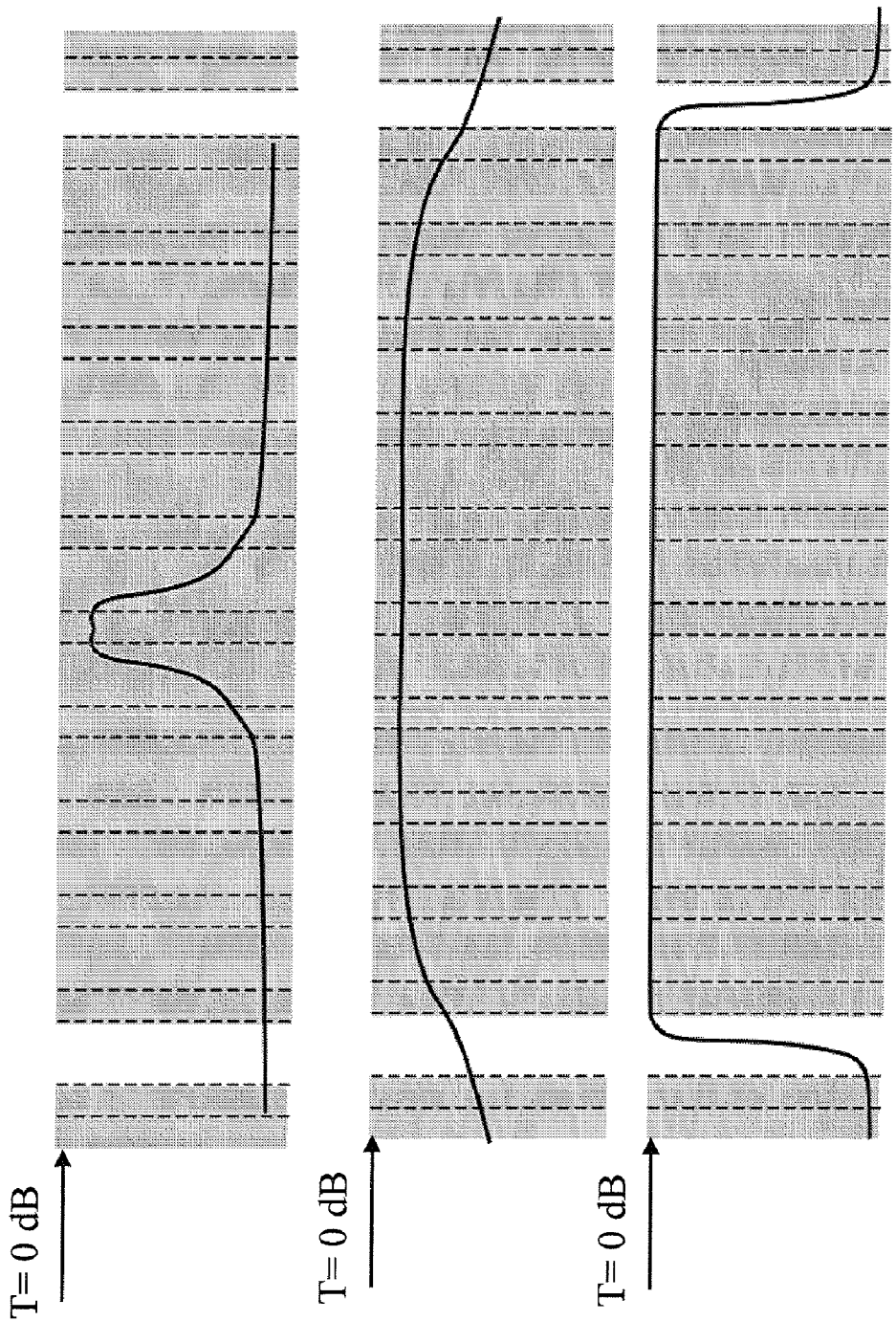
FIG. 6C shows a comparison of the achievable band separation filtering using standard AWG flattop techniques (top), a scaled version (middle) and the instant invention (bottom)

With regard to the wide flattop shape, one is directed to FIG. 6C, which shows the achievable band separation filtering of a standard AWG flattop design compared to an AWG having multi-mode output waveguides. The top diagram in FIG. 6C shows a conventional flattop AWG spectrum designed to demultiplex an individual channel. The spectrum exhibits ripple across the passband and an inherent design loss. One example of such a flattop design is discussed in U.S. Pat. No. 5,412,744, hereby incorporated by reference. The middle diagram of FIG. 6C shows the result of simply scaling the spectrum of the top diagram to cover multiple channels in a band (the grey boxes denote the grouping of individual channel passbands into a sub-band). The resulting spectrum exhibits large crosstalk over the adjacent sub-bands. In contrast, the bottom diagram shows the spectrum of the instant invention which has a wide, flat passband, with no inherent passband loss, and very low crosstalk across adjacent sub-bands.

With regard to achieving no-gap operation, the AWG illustrated in FIGS. 6a,b is able to minimize the space between adjacent sub-bands to less than one channel spacing in a 100 GHz system. In other words, AWG technology has the potential to provide a 10-skip-0 gap. Minimizing the gap between sub-bands is important because channels in the gaps will be neglected or partially neglected in the power measurements, and thus will have a direct impact on the monitoring accuracy. Notably, TFFs and/or other demultiplexing techniques are not able to provide this level of accuracy.

With regard to monitoring speed, the spectral tilt monitor in accordance with the instant invention has been found to correct tilt using a VOA and/or GFF in less than about one microsecond.

In the embodiment described with regards to FIGS. 6a,b, the AWG is either temperature sensitive or athermal. In the prior art, AWGs are generally fabricated to be athermal to prevent the wavelength channels from shifting with changes in temperature. In the AWG of the instant invention, however, temperature correction and/or stabilization is not always necessary. For example, since the sub-band bandwidth is wide and the channels discrete, the change in optical power of each sub-band will largely depend only on its edge channels. In other words, the total impact will be dependent on the band population distribution. In a fully populated band, negligible slope and/or power errors have been found for the full −5 to 65 operating range.

Figure 6D:
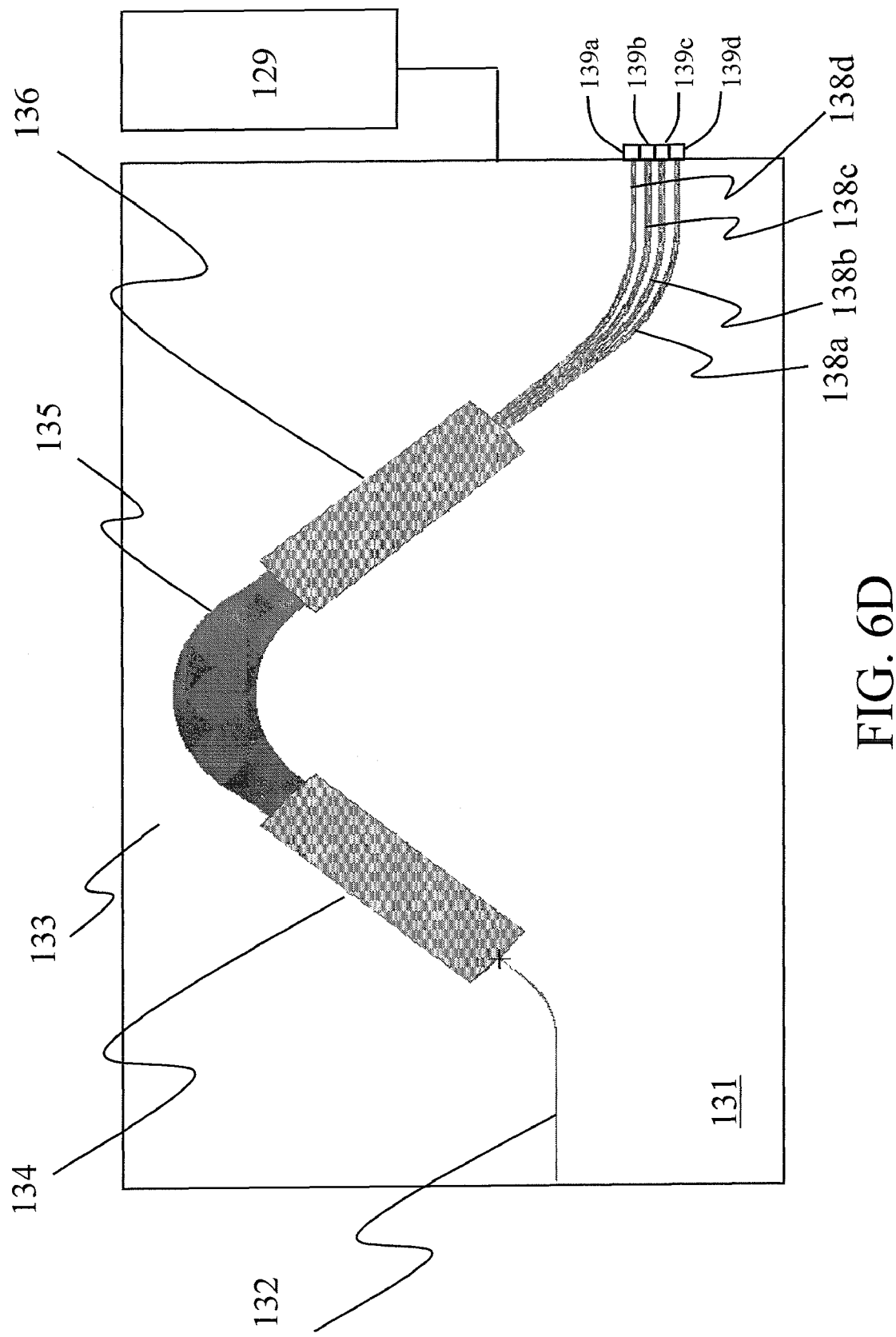
FIG. 6D is a schematic diagram of another demultiplexer based on a AWG that is suitable for use in the spectral tilt monitor shown in FIG. 1.

Referring to FIG. 6D, there is shown another embodiment of the band demultiplexer 31 described with respect to FIG. 1. The demultiplexer is based on an AWG 131 that includes a single, single-mode input waveguide 132, a first slab waveguide 134, a waveguide array 135 having a plurality of single-mode waveguides with different lengths, a second slab waveguide 136, and four multi-mode output waveguides 138a-d, all of which are disposed on a single substrate 133. For illustrative purposes, the AWG 131 is based on a standard 40 channel 100 GHz AWG. A heater 129 is coupled to the substrate so as to uniformly heat the waveguide array 135. Four photodetectors 139a-d, which are also coupled to the substrate 133, are each positioned at the end of a different multi-mode waveguide 138a-d. Preferably, each photodetector 139a-d has a width sufficiently large to collect all the light from the corresponding multi-mode output waveguide 138a-d. This criteria is met, for example, if the photodetector has a width greater than the width of the output of the corresponding multi-mode waveguide. One example of a suitable photodetector is an edge mounted photodetector. Optionally, the photodetectors 138a-d are provided as an array to reduce manufacturing costs.

Notably, this embodiment takes advantage of the fact that the center wavelength of each of the sub-bands is tunable with changes in temperature. This temperature sensitivity is used to further improve the spectral resolution.

In operation, a 40 channel WDM optical signal is launched into the single-mode input waveguide 132 where it is passed through the first slab waveguide 134 and directed into the waveguide array 135. Since the plurality of waveguides in the array have different lengths, the different portions of optical signal propagating through different waveguides will have different phases and interference will occur. This interference results in the demultiplexing of the optical signal, the demultiplexed components of which are imaged on the outside edge of the second slab waveguide 136. Each of the four multi-mode output waveguides 138a-d is fabricated to be sufficiently wide to collect 10 adjacent wavelength channels. The optical power of each of the four sub-bands is measured with a different photodetector (i.e., one of 139a-d). Upon a first activation of the heater 129, the temperature is increased. This increase in temperature shifts the center wavelengths of the light collected in each of the sub-bands to a higher wavelength value. Since the edge channels of the sub-bands change, this results in four new optical power measured readings. Upon a second activation of the heater 129, the temperature is decreased. This decrease in temperature shifts the center wavelengths of the light collected in each of the sub-bands to a lower wavelength value. Since the edge channels of the sub-bands change again, this results in an additional four new optical power measured readings. The spectral tilt is then plotted as a least square fit using the twelve optical power measurements. Advantageously, this configuration results in an increased spectral resolution for the same number of photodetectors.

The spectral tilt monitor 30 illustrated in FIG. 1 is depicted in a feedback configuration for illustrative purposes. In addition, or alternatively, it is possible for the spectral tilt monitor 30 to be used in a feed-forward configuration. In fact, in many WDM systems it is advantageous to monitor spectral tilt both upstream and downstream of the optical amplifier 20.

Figure 7:
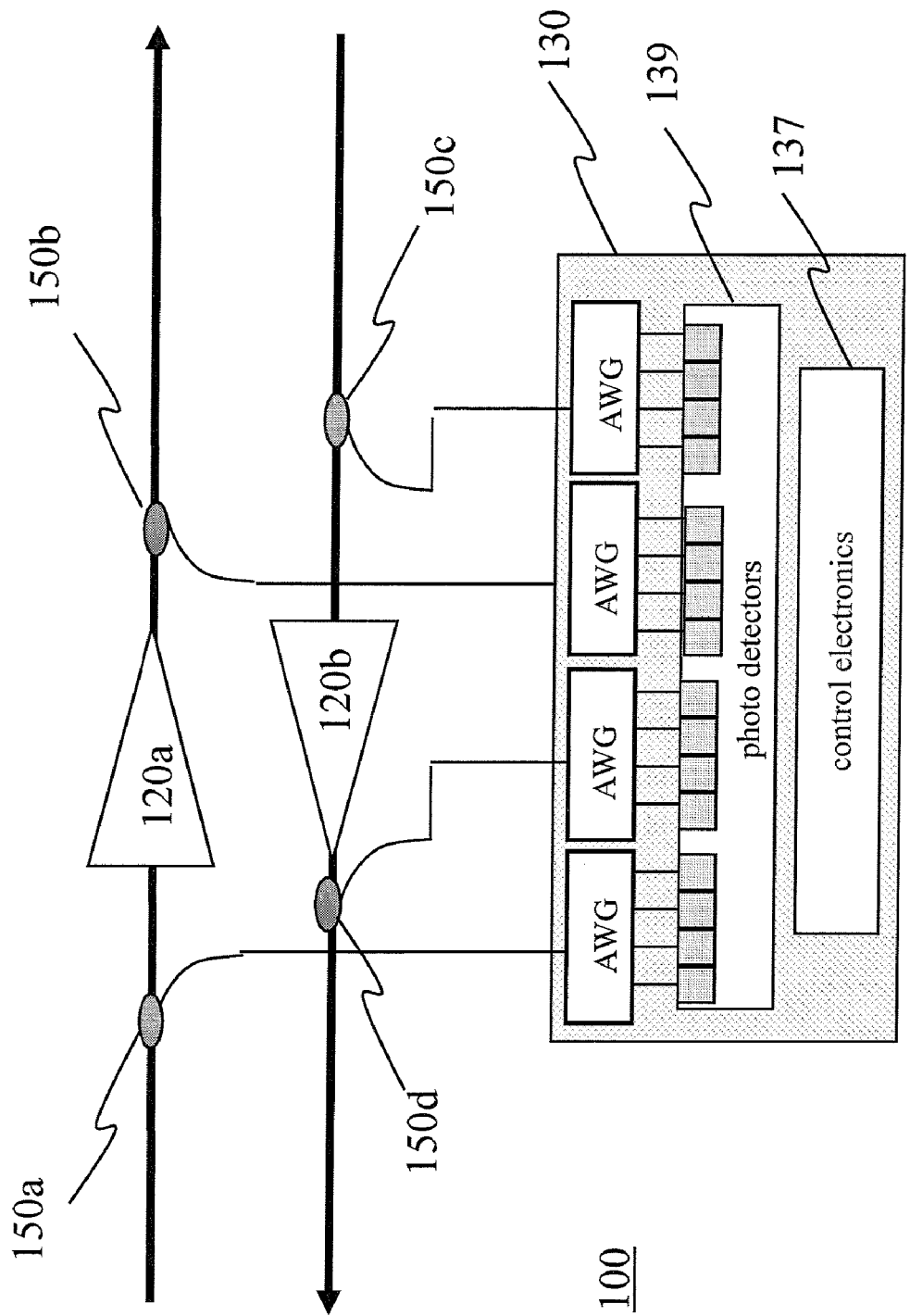
FIG. 7 is a schematic diagram of a bi-directional node in a WDM system having a spectral tilt monitor in accordance with one embodiment of the instant invention; and, FIG. 8 is a schematic diagram of a chip having four AWG with multi-modal ouput waveguides.

Referring to FIG. 7, there is shown a schematic diagram of a node in a bi-directional fiber link. The node 100 is shown to include first 120a and second 120b optical amplifiers, a spectral tilt monitor 130, and various taps 150a-d.

The first 120a and second 120b optical amplifiers amplify WDM optical signals transmitted into the node 100. One example of a suitable optical amplifier is a rare-earth doped fiber amplifier, such as an erbrium-doped fiber amplifier (EDFA). Of course, other optical amplifiers, such as a Raman amplifier or Raman EDFA hybrid, are also possible. The optical amplifier 120 boosts the power level of all the wavelength channels in the WDM optical signal(s) at the same time, while simultaneously introducing spectral tilt and/or intensifying spectral tilt introduced upstream from the amplifiers 120a/120b.

The spectral tilt monitor 130 monitors and/or measures the spectral tilt upstream and downstream of the optical amplifiers 120a/120b. In accordance with the instant invention, the spectral tilt monitor 130 includes four AWGs, each AWG for separating the WDM optical signal(s) into four sub-bands, each sub-band having a different wavelength range and a known maximum number of wavelength channels. The bandwidth of each sub-band is the same or different from adjacent sub-band(s). Each sub-band is either fully loaded, not loaded, or partially loaded. The spectral tilt-monitor 130 also includes a plurality of photo-detectors 139 for measuring the total optical power of each sub-band and control electronics 137 for calculating the spectral tilt based on the total optical power in each sub-band. Optionally, a temperature controller (not shown) is provided to tune the AWG.

A spectral tilt compensator (not shown) receives a control signal from the spectral tilt monitor 130 and compensates for the spectral tilt. Some examples of suitable spectral tilt compensators include gain flattening filters (GFFs), variable optical attenuators (VOAs), and/or dynamic gain equalizers (DGEs). Alternatively, the spectral tilt compensator is the optical amplifier 120a/120b.

The taps 150a-d, tap a relatively small portion (e.g., 10%) of the amplified optical signal(s) and redirect it to the spectral tilt monitor 130, while the remaining part of the optical signal. One example of a suitable tap is a 10/90 coupler tap.

Figure 8:
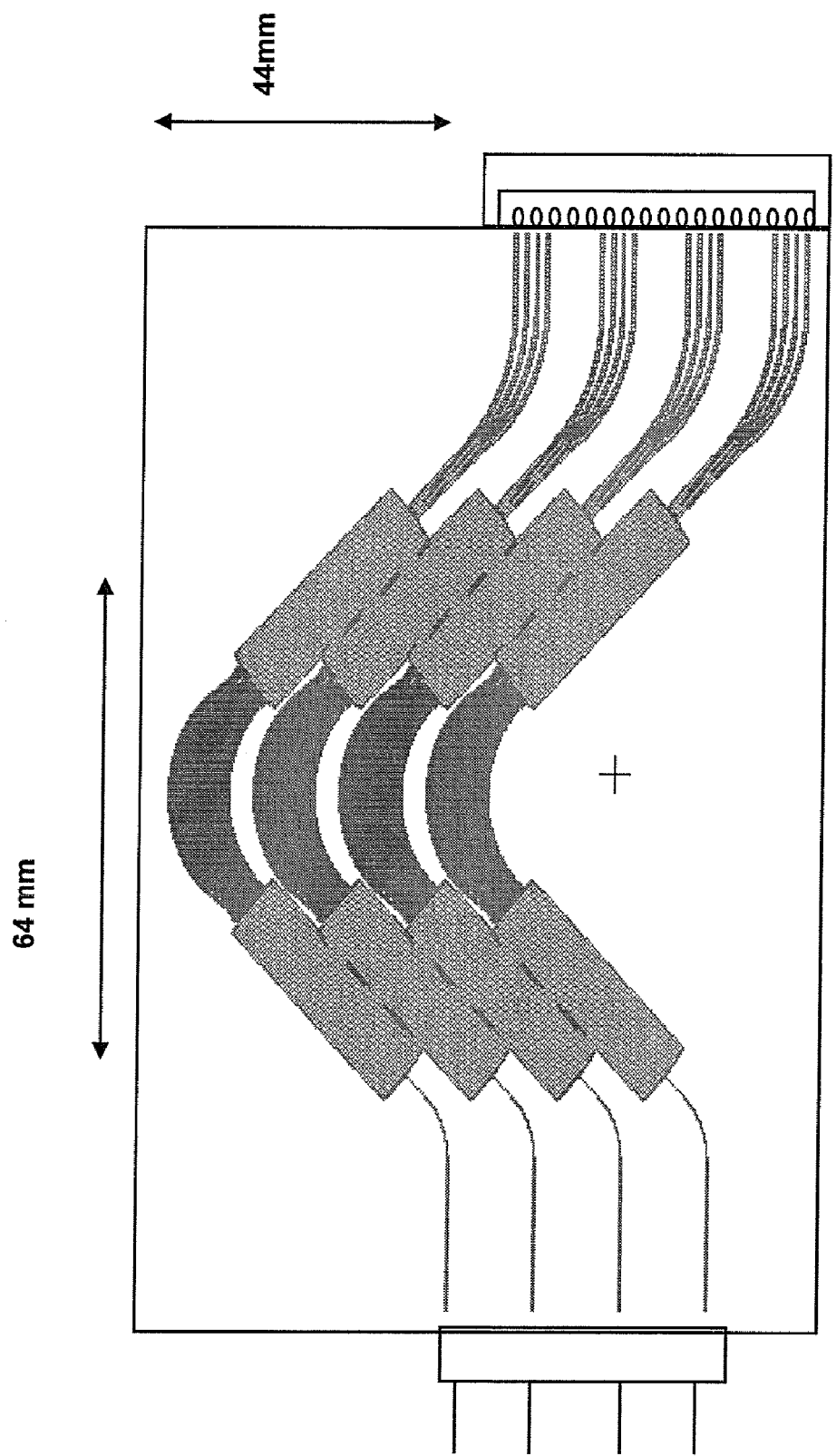

Advantageously, the spectral tilt monitor 130 integrates four AWGs, sixteen photodiodes, a temperature controller, and/or the photodiode bias circuitry, all on the same chip. Moreover, one set of control electronics is used to monitor and calculate the spectral tilt of each of the four tapped signals. Accordingly, this configuration results in a very compact device and reduces the required number of components. Referring to FIG. 8, there is shown one configuration of a chip with four AWGs that has been found to fit in a standard, fully qualified, AWG type package.

The embodiments of the invention described above are intended to be exemplary only. For example, while the embodiments described above are based on a standard 40 channel 100 GHz AWG with multi-mode output waveguides having a width sufficient to collect about 10 wavelength channels, thereby providing a means for monitoring the optical power in four different sub-bands, it is also possible to monitor the spectral tilt using more or fewer sub-bands in WMD systems with more or less channels. Furthermore, while the AWG with multi-mode output waveguides is very valuable for use in the spectral tilt monitor, other uses are also envisioned. The scope of the invention is therefore intended to be limited solely by the scope of the appended claims.

What is claimed is:

1. An arrayed waveguide grating comprising:
    an input waveguide for transmitting a multiplexed optical signal having n wavelength channels;
    a waveguide array having a first end optically coupled to a first slab waveguide and a second end optically coupled to a second slab waveguide, the first slab waveguide for receiving the multiplexed optical signal from the input waveguide, the second slab waveguide for focusing n demultiplexed sub-signals of the multiplexed optical signal to n separate locations; and,
    a plurality of multi-mode output waveguides optically coupled to the second slab waveguide, each multi-mode output waveguide having a width selected to collect a plurality of the demultiplexed sub-signals.

2. An arrayed waveguide grating according to claim 1, wherein the input waveguide is a single mode waveguide.

3. An arrayed waveguide grating according to claim 1, wherein each multi-mode output waveguide is optically coupled to a photodetector used to produce an optical power measurement for calculating spectral tilt.

4. An arrayed waveguide grating according to claim 3, wherein the input waveguide comprises a single mode waveguide.

5. An arrayed waveguide grating according to claim 4, wherein the arrayed waveguide grating is for separating the multiplexed optical signal into a plurality of sub-bands, each sub-band including more than one wavelength channel.

6. An arrayed waveguide grating according to claim 5, wherein each multi-mode output waveguide in the plurality is coupled to a photodetector for measuring an optical power in each of the sub-bands.

7. An arrayed waveguide grating according to claim 6, comprising control electronics for calculating spectral tilt of the multiplexed optical signal using the measured optical power in each of the sub-bands.

8. An arrayed waveguide grating according to claim 7, wherein the photodetectors are part of a photodetector array.

9. An arrayed waveguide grating according to claim 5, wherein each sub-band in the plurality of sub-bands spans a different wavelength range.

10. An arrayed waveguide grating according to claim 1, comprising a heating element for tuning the arrayed waveguide grating.

11. An arrayed waveguide grating according to claim 1, wherein each multi-mode output waveguide has a width selected to collect a plurality of adjacent wavelength channels.

* * * * *